J. B. FUNKHOUSER, DEC'D.
S. B. FUNKHOUSER, ADMINISTRATRIX.
NUT LOCK.
APPLICATION FILED FEB. 8, 1911.

997,249.

Patented July 4, 1911.

WITNESSES:
Samuel E. Wade
Amos W. Hart

INVENTOR
JOHN B. FUNKHOUSER
BY Munn & Co.
ATTORNEYS

UNITED STATES PATENT OFFICE.

JOHN B. FUNKHOUSER, OF NEW BRIGHTON, PENNSYLVANIA, ASSIGNOR OF ONE-FOURTH TO WILLIAM H. FUNKHOUSER, OF NEW BRIGHTON, PENNSYLVANIA; SARAH B. FUNKHOUSER ADMINISTRATRIX OF SAID JOHN B. FUNKHOUSER, DECEASED.

NUT-LOCK.

997,249.          Specification of Letters Patent.      Patented July 4, 1911.

Application filed February 8, 1911. Serial No. 607,232.

*To all whom it may concern:*

Be it known that I, JOHN B. FUNKHOUSER, a citizen of the United States, and a resident of New Brighton, in the county of Beaver and State of Pennsylvania, have invented certain Improvements in Nut-Locks, of which the following is a specification.

My invention is an improvement in that class of nut-locks in which a locking device is used in connection with a washer in such manner as to engage the side of a nut and thus prevent its rotation.

In my improvement, the locking device is so constructed and applied in connection with the washer and the nut as to lock both.

The details of construction, arrangement, and combination of parts are hereinafter described and claimed, and illustrated in the accompanying drawing, in which—

Figure 1:
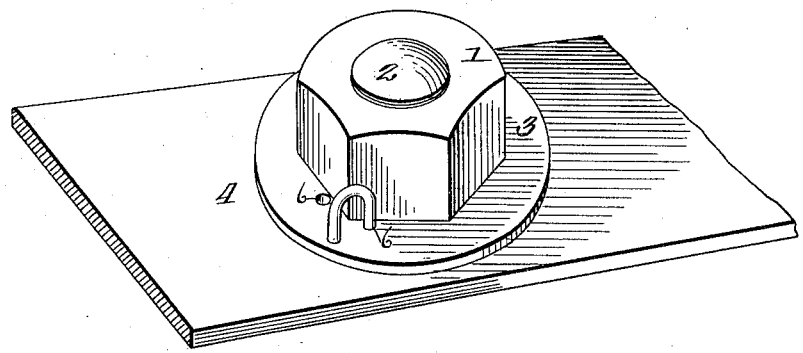
Figure 2:
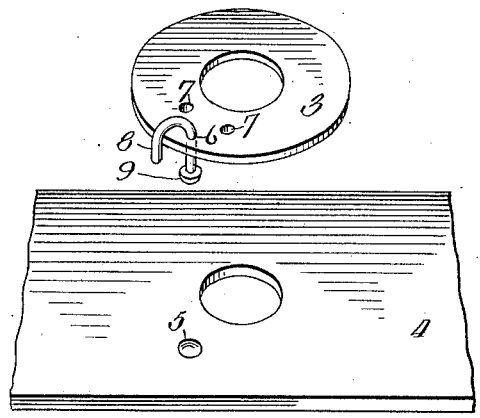
Figure 3:
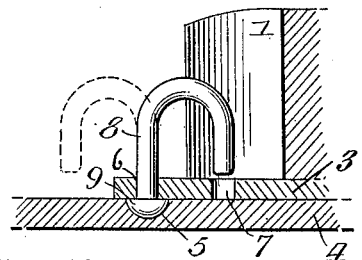
Figure 4:
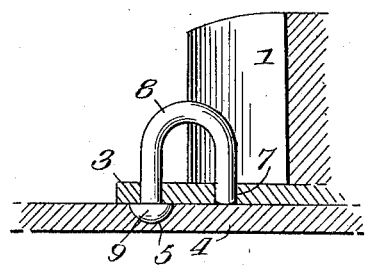

Figure 1 is a perspective view showing the invention as applied in use. Fig. 2 is a perspective view including the locking device, a washer, and a portion of a fish-plate. Figs. 3 and 4 are sectional views illustrating the application of the locking device and the manner of clenching the same to form the lock.

In Fig. 1, a nut 1 is shown applied to a bolt 2 in the usual way, and a washer 3 intervenes between the nut and a fish-plate 4. As shown in Fig. 2, the fish-plate is provided on its face, at a point adjacent to the bolt opening, with a recess or cavity 5, and the washer 3 is also shown provided with three holes, indicated by 6 and 7. These holes are arranged in triangular relation to each other and the fastening device 8 passes through the hole 6, and its inturned end is adapted to engage either of the holes 7 which lie nearer the bolt opening. The said device consists of a pin or small rod bent into U-shape and provided with a head 9. The device is formed of a flexible, as distinguished from elastic, metal, for a reason which will presently appear. The device is applied by passing it through the hole 6 in the washer, and the latter is then applied to the bolt 2, as shown in Figs. 1, 3 and 4, so that the head 9 of the fastening device lies in the cavity or recess 5 of the fish-plate. It is apparent that the device may thus be rotated freely in the opening 6 of the washer.

When turned away from the bolt hole, as shown in Fig. 2 and by dotted lines in Fig. 3, the nut may be applied, and when it is screwed up against the washer, the fastening device is turned into the position indicated in Fig. 3, and a light tap is given it, by means of a hammer or other tool, by which its free end is forced down into one of the holes 7 in the washer; and such hole is in such proximity to the nut that the angles of the same cannot pass the fastening device, so that the nut is locked. The free end of the device will be entered into one or the other of the holes 7, according to the position occupied by the adjacent angle of the nut when screwed home. That is to say, the adjacent angle may be in advance of both the holes 7, or between them, and in the first case the device would be engaged with the left-hand hole 7 in the washer, and in the other case with the right-hand hole, which latter engagement is shown in Figs. 1 and 4.

It is apparent that the construction of the fastening device of flexible metal enables it to be readily bent downward so as to engage a hole 7 in the washer; also, when it is desired to unlock the nut, a tool may be inserted under the loop of the fastening device 8 and the free end of the same thereby raised out of the hole 7, and it may then be swung laterally out of the way of the nut, so that the latter may be unscrewed without obstruction.

The cavity or recess 5 in the fish-plate into which the head of the fastening device fits and whereby the washer is secured in due position for locking the nut, may be formed by a countersink, or by punching, or in the process of manufacture of the fish-plate.

By my improvement, I form a secure lock which may be easily and quickly applied, is reliable in use, and may be produced at a small cost.

What I claim is:—

1. The combination with a bolt, nut, and fish-plate having a face recess adjacent to the bolt hole, and a washer provided with an opening which coincides with said recess, and with other openings located nearer the bolt hole, of a U-shaped fastening device constructed of flexible metal and having an enlarged head adapted to lie in the cavity of the fish-plate, whereby the washer is locked therewith, the inturned free end of the device being so spaced from its body that it is adapted to enter one of the other openings in the washer which are located near the edge of the nut, substantially as described.

2. The combination with a bolt, nut, and a fish-plate, of a washer applied under the nut and provided with holes, one of which is located nearer the bolt hole than the other, and a U-shaped fastening device held in the outer hole of the washer and rotatable therein, its free end being adapted to enter the hole which is nearest the bolt opening, whereby said device may be rotated into and out of position for engagement with the nut, in the manner described.

JOHN B. FUNKHOUSER.

Witnesses:
 M. L. McKENEGHEY,
 LOLA M. CRISS.

Copies of this patent may be obtained for five cents each, by addressing the "Commissioner of Patents, Washington, D. C."